United States Patent [19]
Lin et al.

[11] Patent Number: 6,094,512
[45] Date of Patent: Jul. 25, 2000

[54] FLAT-BED IMAGE READING APPARATUS

[75] Inventors: Pin Hsu Lin; Chien-Hsing Tang; Chien-hung Chen, all of Taoyuan, Taiwan

[73] Assignee: Acer Peripherials Inc., Taiwan

[21] Appl. No.: 09/002,512

[22] Filed: Jan. 2, 1998

[30] Foreign Application Priority Data

Feb. 15, 1997 [TW] Taiwan ................................. 86101775

[51] Int. Cl.⁷ ............................. G06K 9/22; H04N 1/04
[52] U.S. Cl. .......................... 382/315; 358/488; 358/498
[58] Field of Search ................... 358/496, 497, 358/498, 474, 434; 382/312, 315; 355/81, 84, 99

[56] References Cited

U.S. PATENT DOCUMENTS

| | | | |
|---|---|---|---|
| 5,467,102 | 11/1995 | Kuno et al. ................................. 345/1 |
| 5,786,590 | 7/1998 | Lin ........................................... 358/498 |
| 5,936,747 | 8/1999 | Lin et al. .................................. 358/496 |

*Primary Examiner*—Madeleine Nguyen
*Attorney, Agent, or Firm*—Fulbright & Jaworski LLC

[57] ABSTRACT

An image reading apparatus that includes an image scanning module in which an image sensor device is provided. The image reading apparatus includes an upper housing and a pattern located on the bottom surface of the upper housing and positioned at a position x with reference to the edge of the opening. The upper housing has a bottom surface and is provided with an opening for mounting a transparent platen adapted for supporting a document to be scanned. The opening defines an edge. Responsive to detection of the pattern by the image sensor device, the image reading apparatus determines the distance required to move by the scanning module to reach a predetermined positioning line.

9 Claims, 3 Drawing Sheets

FLAT-BED IMAGE READING APPARATUS

FIELD OF THE INVENTION

The present invention relates to an apparatus and method for initially positioning the scanning module of the flat-bed image reading apparatus.

DESCRIPTION OF PRIOR ART

The image scanning module within the image reading apparatus generally includes an image sensor device and a plurality of lenses. Image sensor device, or alternatively named as opto-electric converter, may include well known CCD, CIS, etc. U.S. Pat. Nos. 4,879,604, 5,514,864, and 5,278,674 disclose some pertinent background techniques relating to the flat-bed image reading apparatus.

Placing the scanning module at the precise initialization position within the image reading apparatus is a critical issue that influences the overall image scanning quality. The initialization position determines where the first scanning line performed by CCD, or CIS is located with respect to the original, i.e. document, being scanned. Accordingly, the initialization position of the scanning module plays a vital role during the image scanning process. It is well known that the scanning module usually is positioned at the initialization position upon power-on of the apparatus, or, is driven to the initialization position after completion of each pass of scanning process.

In the prior-art commercial scanners, the initially positioning of the scanning module is usually accomplished through co-operation of a sensor disposed at location inside the housing of the flat-bed image reading apparatus and a corresponding actuator located on the scanning module. Particularly, the prior-art scanning module is driven by a belt, which is directly powered by a driving motor, and the scanning module moves longitudinally with respect to the document. When the scanning module moves to the preset initialization position, an assertion signal is sent from the position sensor which is triggered by the actuator. Then this assertion signal is detected by a microprocessor within the image reading apparatus. As a result, the microprocessor generates a control signal instructing the scanning module to stop at the preset initialization position. However, when implementing the above mentioned design, complexity with respect to design, manufacturing as well as assembly are involved. Furthermore, the yield rate drops due to its precision requirement involved during the assembly. If the position sensor and/or the actuator malfunctions during the scanning process, the overall result of scanning process is considered as failing. Besides, more components in a design means higher cost.

SUMMARY OF THE INVENTION

It is, therefore, the object of this invention to provide an apparatus and method for initially positioning the scanning module without the use of the conventional position sensor and corresponding actuator.

The image reading apparatus is provided to include an image scanning module in which an image sensor device is included. The image reading apparatus includes an upper housing which is provided with an opening for mounting a transparent platen adapted for supporting an original to be scanned, and the opening defines an edge. A pattern is disposed on the bottom surface of the upper housing and positioned at a position x with reference to the edge of the opening. Responsive to detection of the pattern by the image sensor device, the image reading apparatus determines the distance required to move by the scanning module to reach a predetermined positioning line.

DETAILED DESCRIPTION OF PREFERRED EMBODIMENT

The basic function of the image reading apparatus is to transform an image into electric digital data through a CCD within a scanning module. The digital data obtained can be stored and processed by a computer. The image includes forms of graphics and text. Based on the utilization of the basic function of the image reading apparatus, the invention employs a pattern in positioning the scanning module at its initialization position.

Figure 1A:
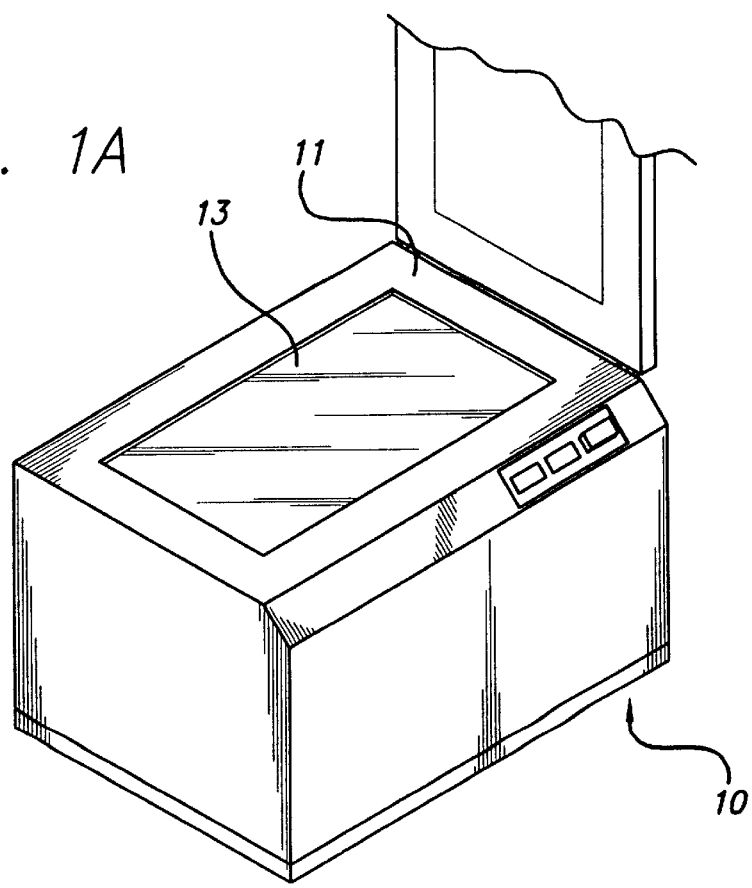
FIG. 1a shows a flat-bed image reading apparatus in perspective view.
Figure 1B:
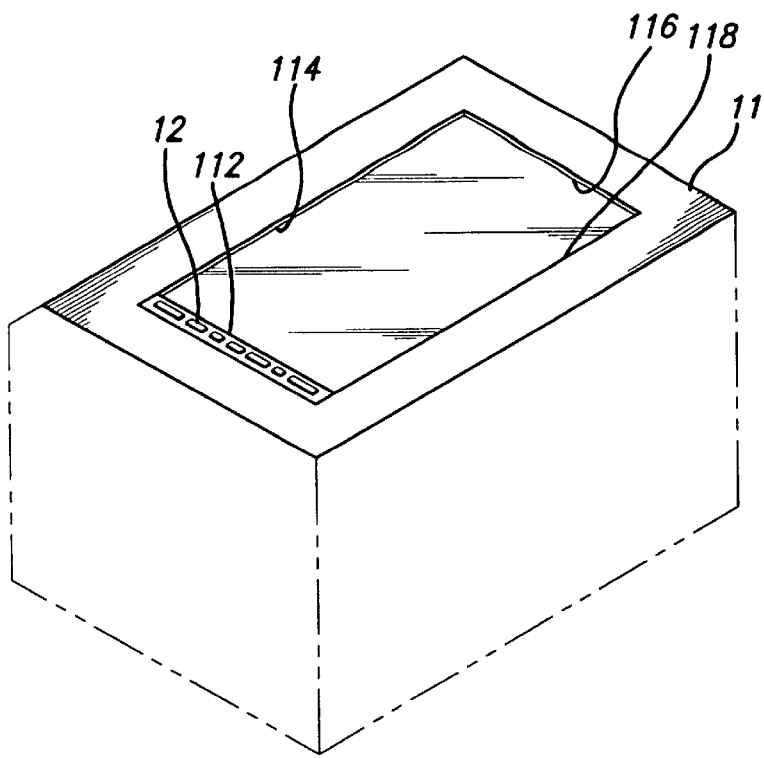
FIG. 1b illustrates the bottom surface of the upper housing of the image reading apparatus according to the present invention and the position at which the pattern provided by the invention is located.

As shown in FIG. 1a, a flat-bed image reading apparatus 10 includes an upper housing 11 that is provided with an opening for mounting a document-support transparent platen 13. The document, or the original, to be scanned is placed on the top surface of the transparent platen 13. The transparent platen 13 may be a glass platen or an equivalent. As shown in FIGS. 1a and 1b, the opening provided at the upper housing 10 defines the edges 112, 114, 116, and 118 which are adapted to receive the transparent platen 13.

Figure 2:
FIG. 2 shows an embodiment of the pattern.
Figure 3A:
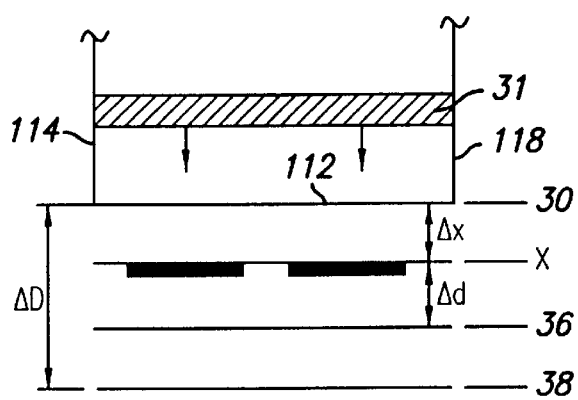
FIG. 3a shows the location relationship between the pattern and the positioning line.

As shown in FIG. 1b and FIG. 3a, along the edge 112 of the upper housing 11, a pattern 12 is provided on the bottom surface. As shown in FIG. 3a, the pattern 12 is disposed at the position x which is distanced from the edge 112 by amount of $\Delta x$, wherein, $\Delta x \geq 0$. The pattern 12 consists of a plurality of stripes, or, alternatively, graphics or texts or a combination thereof. The pattern 12 may be in color form or, alternatively, black/white form. The pattern 12 may be printed, along the edge 112, onto the bottom surface of the upper housing 11 and becomes part of the bottom surface. In an alternative, the pattern 12 can be a separate item stick onto the bottom surface, along the edge 112, of the upper housing 11. A preferred embodiment of the pattern 12 is shown in FIG. 2 that consists of a plurality of interleaved black and white stripes.

In the start-up period of a scanning process, the scanning module 31 is in an accelerated condition before an constant velocity is reached. Therefore, during this acceleration period, the scanning module 31 does not scan the image, otherwise the image scanned within this interval will be deformed. In light of this concern, the initialization position of the scanning module 31 is located at a $\Delta D$ distance relative to the edge 112. $\Delta D$ is a predetermined distance to allow the scanning module 31 to accelerate from still to reach a condition that the scanning module 31 is ready to scan the image. The predetermined distance $\Delta D$ may also include other mechanical considerations than the acceleration period mentioned above.

As shown in FIG. 3a, during power-on or return stroke from a previous scan operation, the scanning module 31 moves toward the pattern 12 and is actuated to scan image simultaneously. There is a microprocessor installed within the control circuit of the flat-bed image reading apparatus to identify the pattern 12 from the scanned image through a predetermined algorithm. The reference line 30 is an extension from the edge 112 and the imaginary line 36 is a line where the scanning module 31 locates when the microprocessor determines that certain criterion of the predetermined algorithm is met. After the pattern 12 is scanned by the scanning module 31 and before the determination of certain criterion of the predetermined algorithm as being met, it takes the microprocessor a period of time $\Delta t$ to perform the algorithm calculation. In this $\Delta t$ interval, the scanning module 31 keep moving a corresponding displacement of $\Delta d$ to reach line 36. After the microprocessor determines that the criterion of the predetermined algorithm is met, the scanning module 31 should keep moving a displacement of $\Delta D-\Delta d-\Delta x$ to reach the position line 38. In other words, the scanning module 31 should keep moving from location denoted as line 36 to line 38.

Figure 3B:
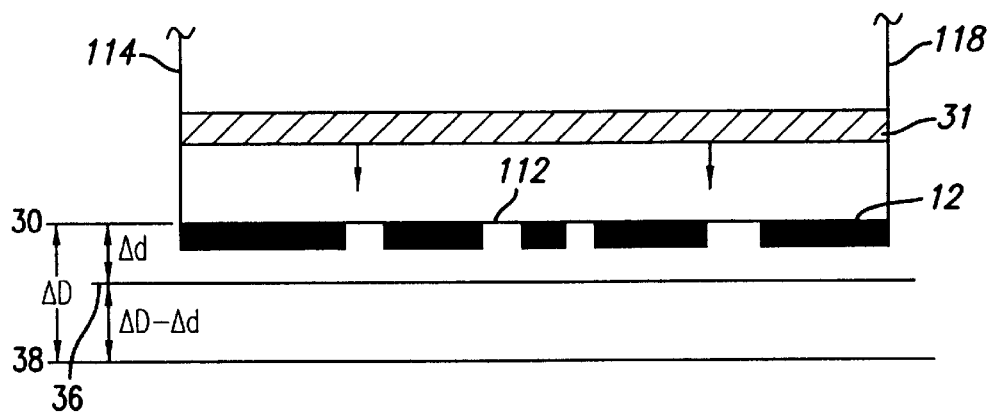
FIG. 3b shows a preferable embodiment of the relationship between the pattern and the positioning line.

In the preferable embodiment, as shown in FIG. 3b, the position x of the pattern 12 is tangent to the edge 112, i.e. $\Delta x=0$. Accordingly, after the microprocessor determines that the predetermined criterion is met, the scanning module 31 keep moving a displacement of $\Delta D-\Delta d$ for this preferred embodiment.

The predetermined criterion can be defined based on any well known image comparison algorithm, for example, the gray scale comparison, the chroma comparison, or text-line comparison, etc.

For instance, as the gray scale comparison is employed as the predetermined algorithm in the preferred embodiment, the gray scale value corresponding to the pattern shown in FIG. 2 can be obtained by a series of test runs, and is pre-stored in the microprocessor. During the initialization positioning of the scanning module 31, the microprocessor determine that the pattern 12 has been scanned based on whether certain criterion of the gray scale comparison is met or not. For instance, the criterion may be the gray scale value calculated during the initialization positioning of the scanning module 31 differs from the pre-stored value by less than 1%.

Figure 4:
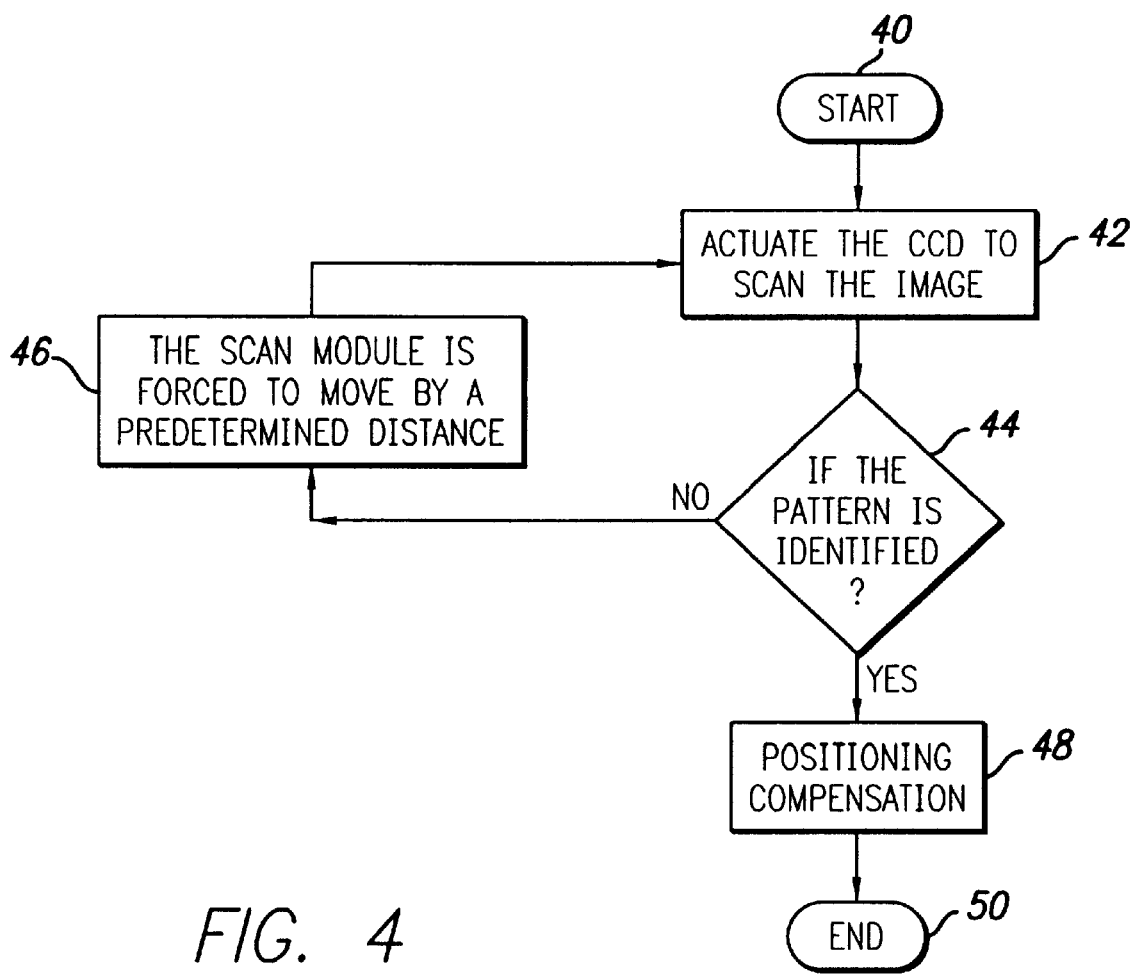
FIG. 4 shows the flow chart of the method of the present invention.

Referring to FIG. 4, it shows the flow chart of the present invention. Step 40 is the starting point of the initialization positioning process of the scanning module 31. In step 42, the scanning module 31 actuates the image sensor, i.e. CCD, to scan the image. In step 44, the process determines whether the pattern 12 is identified based on the predetermined algorithm. If the result of block 44 is No, the process goes to step 46. In step 46, the scanning module 31 is forced to move toward the pattern 12 by one predetermined distance. In general, if the scan resolution is 300 dpi, the predetermined distance is 1/300 inch. Afterwards, the process returns to step 42. This loop will continue until the microprocessor determine the pattern 12 is being scanned in step 44. In other words, if the result of block 44 is Yes, the process goes to step 48. In step 48, the scanning module 31 moves further by a displacement that equals to $\Delta D-\Delta d-\Delta x$. In the preferable embodiment of the $\Delta x$ being zero, the scanning module 31 moves further by a displacement that equals to $\Delta D-\Delta d$. The step 50 is the end of the initialization process.

From the forgoing descriptions, it can be readily appreciated that the initialization positioning of the scanning module 31 is effectively attained through the basic function of the scanning module 31, and, specially, without any position sensor or the likes.

The present invention is concluded with the following advantages.

1. The design and assembly work is simplified. As the position sensor and corresponding wiring are eliminated, the design and/or the assembly work are simplified. The overall configuration is simplified and more space are left for other design consideration.
2. The overall manufacturing cost is lowered. As the position sensor, the corresponding wiring and connections are eliminated, the manufacturing cost is lowered accordingly.
3. The fail rate of the scanning apparatus is lowered. It is agreed that the more the component number, the higher the fail rate. By the provision of the present invention, the position sensor is eliminated. The yield rate of the image reading apparatus increases and less maintenance is required.

While the preferred embodiment of the present invention has been illustrated and described above, it would be obvious to those skilled in the art that various changes and modifications can be made without departing from the spirit and scope of the invention. For example, as the operating speed of the CPU increases, the time, i.e. $\Delta t$, required by the microprocessor to determine whether the predetermined criterion has been met can be ignored. Therefore, the corresponding $\Delta d$ can be ignored totally. It is therefore intended that all such equivalent changes and modifications that are within the scope of the present invention.

What is claimed is:

1. An image reading apparatus of the type that includes an image scanning module in which an image sensor device is provided, said image reading apparatus comprising:

an upper housing, the upper housing having a bottom surface and being provided with an opening for mounting a transparent platen adapted for supporting a document to be scanned, the opening defining an edge, and a pattern located on the bottom surface of said upper housing and positioned at a position x with reference to the edge of the opening, wherein, responsive to detection of said pattern by said image sensor device, the image reading apparatus determines a distance required to move by said scanning module to reach a predetermined positioning line; and a microprocessor for processing a signal obtained from said scanning module, wherein said scanning module moves a distance of $\Delta d$ during an interval which begins at capture of said pattern by said scanning module and ends at determination by the microprocessor of a predetermined criterion as being met, wherein after said predetermined criterion is met, said scanning module further moves a displacement of $\Delta D-\Delta d-\Delta x$, wherein $\Delta D$ is a distance between said positioning line and said edge, and $\Delta x$ is a distance between said pattern and said edge.

2. An image reading apparatus as recited in claim 1, as $\Delta x$ equals to zero, wherein after said predetermined criterion is met, said scanning module further moves a displacement of $\Delta D-\Delta d$.

3. A method for positioning a scanning module within an image reading apparatus at a predetermined positioning line, an image sensor device is provided in the scanning module, said image reading apparatus comprising an upper housing and a pattern, the upper housing having a bottom surface and being provided with an opening for mounting a transparent platen adapted for supporting a document to be scanned, the opening defining an edge, and the pattern being located on the bottom surface of said upper housing and positioned at a position x with reference to the edge of the opening, the predetermined positioning line being distanced from the edge by an amount of $\Delta D$, said method comprising the steps of:

(1) making said scanning module move toward said pattern and, at the same time, actuating said scanning module to scan image;

(2) repeating step (1) till image scanned by the scanning module meets a predetermined criterion;

(3) making said scanning module further move a distance of $\Delta D-\Delta d-\Delta x$, wherein the $\Delta d$ is the distance traveling by the scanning module during an interval which begins at the capture of said pattern by said scanning module and ends at the determination by a microprocessor of the predetermined criterion as being met, $\Delta D$ is a distance between said positioning line and said edge, and $\Delta x$ is a distance between said pattern and said edge.

4. A method of positioning scanning module as recited in claim 3, as $\Delta x$ equals to zero, wherein after said predetermined criterion is met, said scanning module further moves a displacement of $\Delta D-\Delta d$.

5. A method of positioning scanning module as recited in claim 3, wherein said pattern consists of a plurality of interleaved black and white stripes.

6. A method of positioning scanning module as recited in claim 3, wherein said pattern consists of a plurality of interleaved color patterns.

7. A method of positioning scanning module as recited in claim 3, wherein said pattern consists of a text.

8. A method of positioning scanning module as recited in claim 3, wherein said pattern is formed on said bottom surface of said upper housing by a printing process.

9. A method of positioning scanning module as recited in claim 3, wherein said pattern is formed on said bottom surface of said upper housing by an attachment process.

* * * * *